United States Patent [19]
Ukai et al.

[11] Patent Number: 5,184,005
[45] Date of Patent: Feb. 2, 1993

[54] NON-DECODED TYPE BAR CODE READING APPARATUS

[75] Inventors: Naoki Ukai, Okazaki; Koji Mori, Oobu, both of Japan

[73] Assignee: Nippondenso Co. Ltd., Kariya, Japan

[21] Appl. No.: 637,706

[22] Filed: Jan. 7, 1991

[30] Foreign Application Priority Data

Jan. 8, 1990 [JP] Japan .................................. 2-2077

[51] Int. Cl.$^5$ .............................................. G06K 7/10
[52] U.S. Cl. ................................... 235/472; 235/462; 235/463
[58] Field of Search ...................... 235/462, 463, 472

[56] References Cited
U.S. PATENT DOCUMENTS

| | | | |
|---|---|---|---|
| 4,528,444 | 7/1985 | Hara et al. | 235/462 |
| 4,818,856 | 4/1989 | Matsushima et al. | |
| 4,845,348 | 7/1989 | Ho et al. | 235/463 |
| 4,864,112 | 9/1989 | Imai et al. | |
| 4,900,907 | 2/1990 | Matsusima et al. | |

*Primary Examiner*—Harold Pitts
*Attorney, Agent, or Firm*—Cushman, Darby & Cushman

[57] ABSTRACT

A bar code reading apparatus for optically reading a bar code comprising bars and spaces successively and alternately arranged to output a digital signal to a decoder placed at the reading apparatus. The reading apparatus includes a conversion circuit for converting the bar code information into a digital signal having high-level and low-level portions with time periods corresponding to the widths of the bars and spaces. Also included in the reading apparatus is a preprocessing unit for converting the digital signal into width data to correct the width data so as to narrow the scattering of the width data. The preprocessing unit reproduces a digital signal on the basis of the corrected width data, which is in turn supplied as the bar code information to the decoder. With this arrangement, the decoder can easily and surely decode the inputted bar code information.

19 Claims, 8 Drawing Sheets

NON-DECODED TYPE BAR CODE READING APPARATUS

BACKGROUND OF THE INVENTION

The present invention relates generally to a bar code reading apparatus, and more particularly to a non-decoded bar code reading apparatus arranged so as to output bar code data to an external bar code-to-character code converter (or decoder) without converting or decoding it into character code data (ASCII, JIS or others).

Conventionally, an apparatus known for reading optical information is a decoded type bar code reading apparatus, in which bar code data is read through a scanner to be decoded by an decoder and then encoded into the corresponding character data which is in turn outputted to an external circuit. There is a problem which arises with such an arrangement of the conventional bar code reading apparatus, however, in that in addition to the scanner, the decoder is encased in the apparatus. This limits the optically readable bar code to a bar code of the type suitable for the decoding and encoding programs in advance incorporated into the decoder. On the other hand, a non-decoded type bar code reading apparatus is also known which is not equipped with a decoder, the bar code data read by the scanner being directly output to an external decoder after being electrically processed. According to such a non-decoded type bar code reading apparatus, the scanner and the decoder are not integrated so as to allow use with a combination of different systems. One of the important problems faced in such a conventional non-decoded type bar code reading apparatus relates to the fact that the reading accuracy or capacity allowed for the whole system greatly depends upon the decoding ability of the decoder. In addition, because the conventional non-decoded type bar code reading apparatus directly outputs the bar code information to an external circuit after performing only the electrical process, there is the possibility that the output signal thereof does not correspond to the read bar code due to generation of optical and electrical distortion in the optically reading operation. Also, it is difficult to accurately decode the bar code data because of scattering in the dimensions of printed bars and spaces (separation between the successive bars) of the bar code.

SUMMARY OF THE INVENTION

It is therefore an object of provide the present invention to a non-decoded type bar code reading apparatus which is capable of easily and accurately decoding the bar code data without being adversely affected by the decoding ability.

With this object and other features which will become apparent as the description proceeding, one feature of this invention is that the bar code reading apparatus comprises conversion means responsive to the bar code information and preprocessing means coupled to the decoder. The conversion means includes an image sensor and a signal processing means so as to read the bar code and output a digital signal corresponding to the read bar code information. The preprocessing means is composed of width data producing means, memory means, correction means, classifying means, digital signal reproducing means and output means to correct the widths of the bars and spaces corresponding to the digital signal from the conversion means and output an accurate digital signal on the basis of the corrected widths of the bars and spaces. The correction means corrects the width data, made by the width data producing means and stored in the memory means, so as to narrow the distribution of the width data in each of the groups classified by the classifying means. A corrected digital signal produced by the digital signal reproducing means on the basis of the width data which is corrected by the correction means is supplied through the output means to the external decoder. Here, the bar code comprises a plurality of ranges of the widths of bars and spaces, and the groups classified by the classifying means substantially correspond to the ranges of the widths. Accordingly, narrowing the distribution of the width data in the group has the same effect as narrowing the distribution of the width data on the range of the width. Thus, the decoder can easily and surely distinguish the range of the width of the bars and spaces indicated by the digital signal, and hence, even in the case of low decoding ability of the decoder, the reading performance of the bar code reading apparatus as a system according to this invention can be increased.

Further, the preprocessing means is for correcting the digital signal indicating the widths of the bars and spaces with its pulse durations (high level) and pulse separations (low level). The digital signal correction is made so as to suppress the scattering of the distribution of the bar and space widths indicated by the high-level time periods and low-level time periods. Thus, even if the bar code detection is scattered in terms of the widths of the bars and spaces of the bar code due to the errors occuring during the conversion to the digital signal, the errors occuring in the bar-code printing and others, the scattering can be suppressed so as to reduce the influence of the various errors on the bar code detection. As a result, the external decoder can easily decode the bar code information digitized in and output from the bar code reading apparatus whereby it is possible to increase the reading performance of the whole system. Moreover, the preprocessing means is for correcting the electric signal representing the widths of the bars and spaces of the bar code. This correction of the electric signal is performed so as to make clear the difference between the ranges of the widths of the bars and spaces indicated by the electric signal. For instance, in the case that there is a first range including narrow widths and a second range including wide widths, the electric signal is corrected so as to enlarge the difference between the widest width in the first range and the narrowest width in the second range. Accordingly, the decoder for decoding the bar code information can easily and surely distinguish the ranges of the widths, thereby increasing the reading performance of the whole system.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
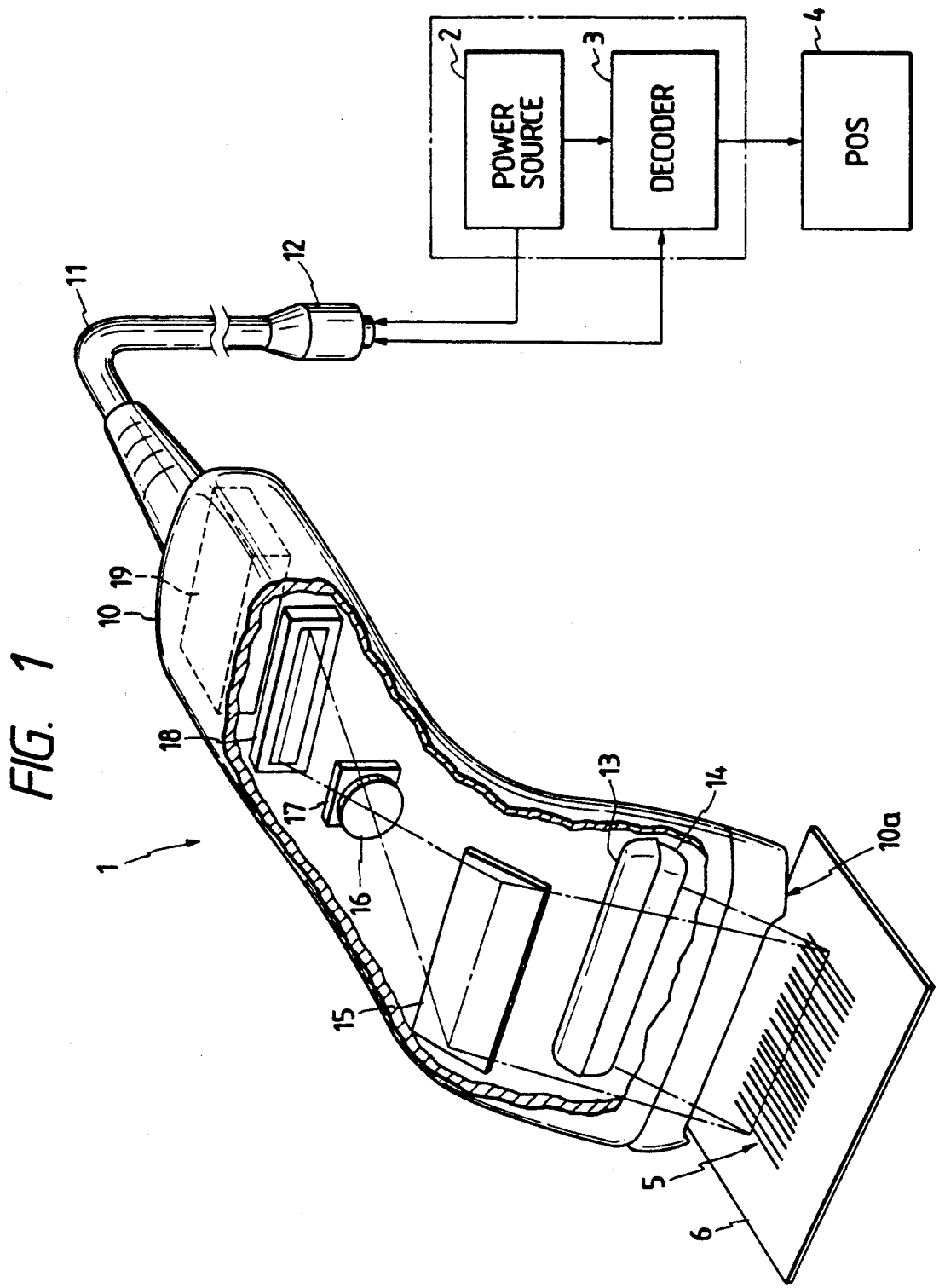
FIG. 1 is a partially broken perspective view showing a bar code reading apparatus for which this invention is employed.

Referring now to FIG. 1, there is illustrated a contact-type bar code reading apparatus to which the present invention is applicable. In FIG. 1, the bar code reading apparatus illustrated at numeral 1 comprises a housing 10 having at its front surface a reading window 10a, a cable 11 extending from the housing 10, and a connector 12 coupled to one end portion of the cable 11. In the housing 10, there is provided a light source 13 comprising a number of high-luminance red-light-emitting diodes successively arranged. Light emitted from the light source 13 is led to a light-scattering member 14 for scattering the light and leading the scattered light toward the reading window 10a so that the scattered light reaches a bar code 5 printed on a recording medium (label) 6. The light reflected on the label 6, including bar code information, is led to a plane mirror (reflection mirror) 15 so as to be reflected thereon and incident on a condensing lens 16 which in turn, reflect the incident light through a diaphragm 17 at a predetermined position in the housing 10 where a one-dimensional image sensor 18 is disposed. The image sensor 18 converts the image into an electric signal. Here, the light source 13 and the image sensor are operated under control of a control unit 19. In this embodiment, the image sensor 18 may be of the CCD (Charge-Coupled Device) type that includes a plurality of picture elements or pixels (for example, 2048 bits) successively arranged so as to successively outputs the corresponding signal at every pixel in accordance with a clock pulse generated from the control unit 19.

To the bar code reading apparatus 1 is coupled a power source 2 whereby a power is supplied through the cable 11 thereto. The output of the bar code reading apparatus indicative of the read bar code information is produced as a digital signal comprising pulses corresponding to the widths of the bars and spaces of the bar code 5, and is supplied through the cable 11 to a decoder 3. The decoder 3 decodes the input digital signal by identifying or discriminating the differences (ranges) of the widths of the bars and spaces of the bar code 5 so as to read the characters, figures or others coded in the bar code form. Moreover, the decoder 3 again encodes the decoded information into a predetermined code such as the ASCII code which is in turn supplied to a POS system (selling management system) 4.

Figure 2:
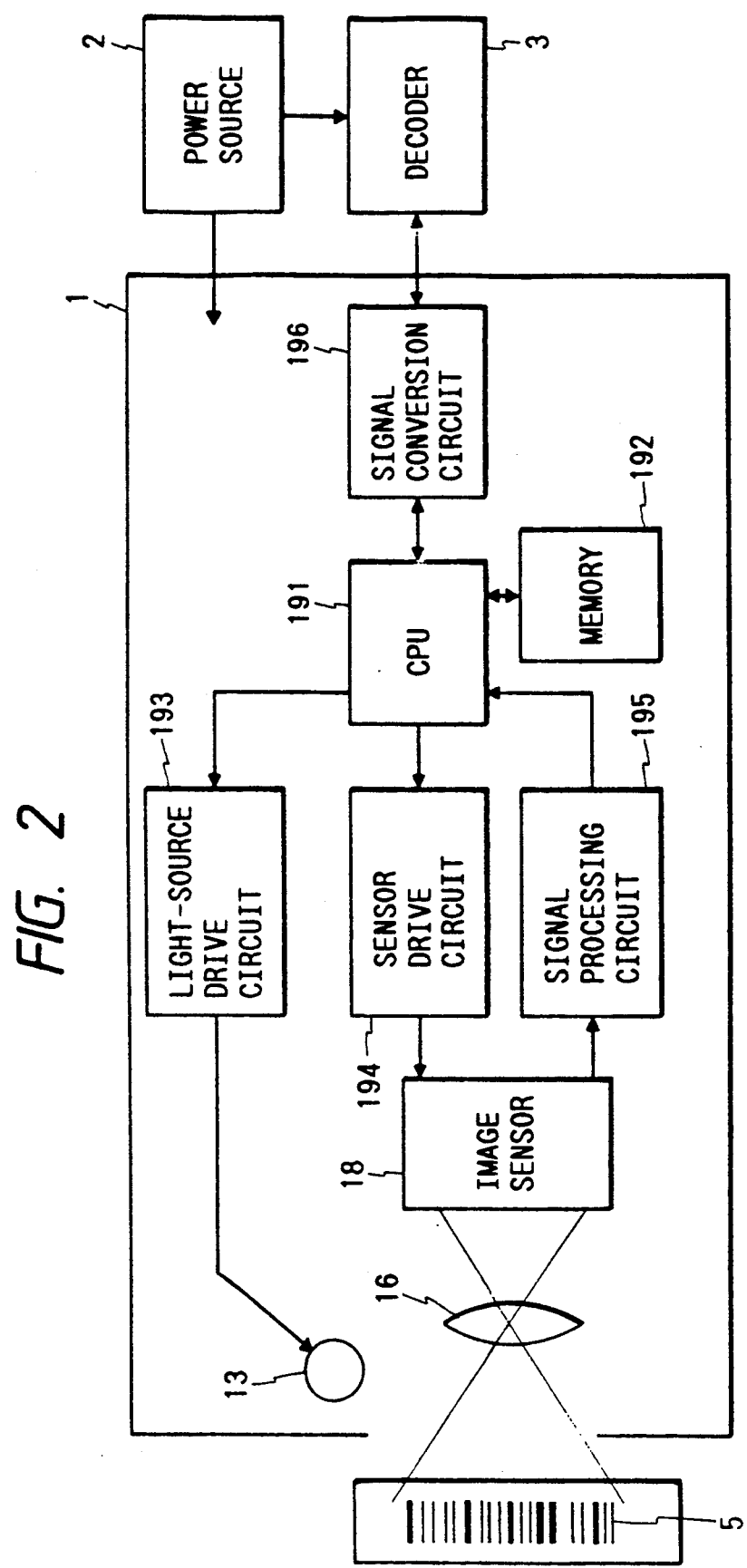
FIG. 2 is a block diagram showing an arrangement of a bar code reading apparatus according to this invention.

FIG. 2 is a block diagram showing an arrangement of the control unit 19, which may be constructed as a microcomputer including a central processing unit (CPU) illustrated at numeral 191 and a memory (RAM, ROM) illustrated at numeral 192. The CPU 191 controls the light source 13 through a light-source drive circuit 193 and further controls the image sensor 18 through a sensor drive circuit 194. The image signal generated from the image sensor 18 at every pixel is led to a sensor-output processing circuit 195 so as to be amplified and smoothed for the purpose of interpolation between the output signals corresponding to the respective pixels, after which the amplified and smoothed signal is digitized and inputted to the CPU 191. Here, the digital signal outputted from the sensor-output procesing circuit 195 is a signal taking high-level states and low-level states in correspondance with the widths of the bars and spaces of the bar code 5, for example, a serial digital signal having high-level tim periods (pulse durations) corresponding to the widths of the bars and having low-level time periods (pulse separations) corresponding to the widths of the spaces.

The CPU 191 is coupled through the input and output signal converting circuit 196 to the decoder 3 for supplying its output signal thereto and receiving the output signal therefrom. The signal converting circuit 196 is for the conversion of the signal level between the CPU 191 and the decoder 3.

Figure 3:
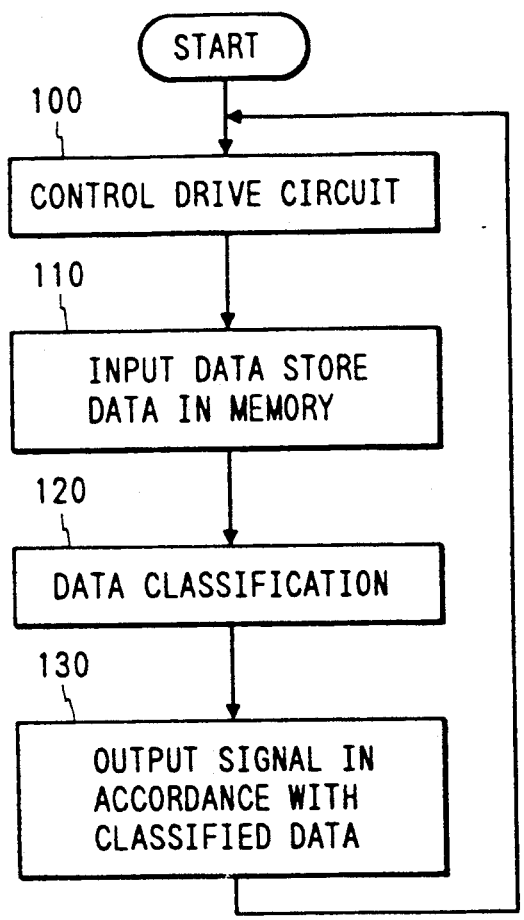
FIG. 3 is a flow chart showing an operation of the bar code reading apparatus according to this invention.

Operation of the control unit 19 will be described below. In response to supply of the power from the power source 2, the light source 13 is energized in accordance with a signal from the light-source drive circuit 193 so as to emit light. With this state, the operator or user operates the bar code reading apparatus 1 by hand such that the reading window 10a faces the bar code 5 as shown in FIG. 1, whereby the bar code 5 is exposed to the light from the light source 13 and the reflected light including the bar code information advances through the reflection mirror 15, condensing lens 16 and diaphragm 17 so as to be reflected on the image sensor 18. Thereafter, the control unit 19 performs the bar code reading operation in accordance with a flow chart illustrated in FIG. 3. In FIG. 3, the operation starts with a step 100 to control the light-source drive circuit 193 and the sensor drive circuit 194 to convert the bar code image on the image sensor 18 into an electric signal. Here, the image sensor 18 is composed of a plurality of pixels arranged one-dimensionally so as to independently convert the image thereon into an electrical signal at every pixel. A step 110 follows to successively output digital signals corresponding to the black-colored bars and white-colored spaces of the bar code 5 from the signal processing circuit 195 to the CPU 191. The CPU 191 counts the widths of the bars and spaces through its internal counter, not shown, and the counted data is successively stored in the memory 192. After completely storing all the width data in the memory 192, the operational flow advances to the next step 120 to classify the width data into a plurality of groups. The width data in each group is statistically processed in order to suppress or reduce the scattering (dispersion) in the distribution and again is stored in the memory 192. Here, each group corresponds to each of the ranges (for example, two ranges consisting of a large size and a small size) of the widths of the bars and spaces of the bar code 5. Thus, the external decoder 5 can easily discriminate the contents (the ranges of the widths) of the bar code 5, i.e., the combination contents of the bars and spaces of the bar code 5 so as to accurately decode the bar code data. A subsequent step 130 is provided to produce a digital signal (corresponding to the digital signal output from the signal processing circuit 195) on the basis of the width data corrected to suppress the scattering in the previous step 120. The produced digital signal is supplied through the signal converting circuit 196 to the decoder 3 which in turn, decodes the input digital signal.

Figure 4:
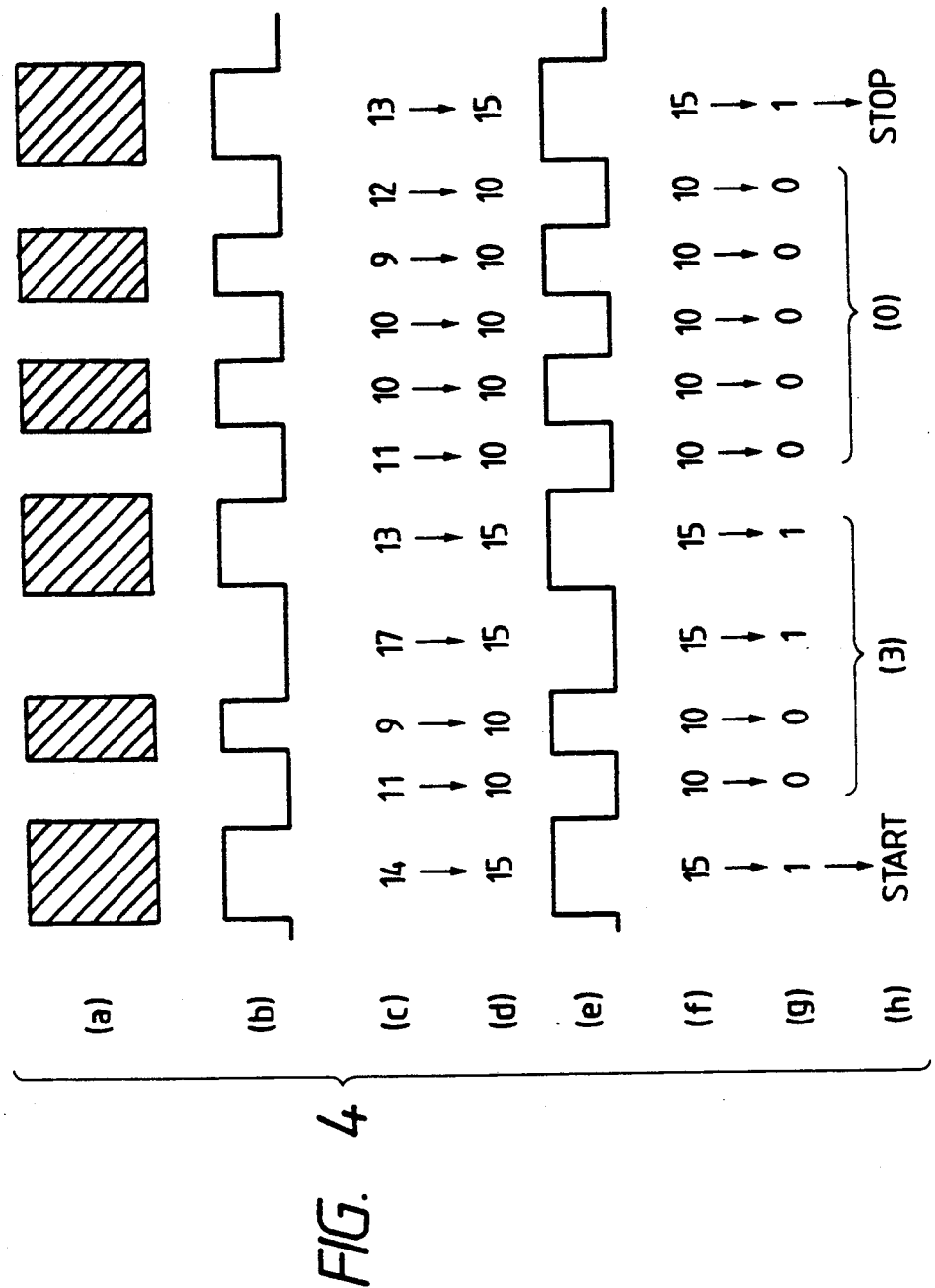
FIG. 4 is an illustration for describing the data processing in the operation of the bar code reading apparatus of this invention.

FIG. 4 is an illustration of data at the respective portions of the flow chart illustrated in FIG. 3. In FIG. 4, (a) represents a bar code printed where cross-hatched portions indicate bars. This bar code is converted by means of the image sensor 18 into an electric signal and further digitized by the signal processing circuit 195 to obtain a digital signal as indicated by (b). The digital signal (b) is actually under the influence of the printing error, error of the optical system of the bar code reading apparatus 1, error of the digitizing process in the signal processing circuit 195 and others. Thus, the digital signal (b) is converted by the CPU 191 into width data as indicated by (c) and then stored in the memory 192. The width data (c) are statistically processed so as to reduce the data scattering to obtain data indicated by (d). For instance, in the process of transforming the data (c) to the data (d), as being illustrated, the datum (14) corresponding to the leftmost widest bar is corrected to the datum (15) and the datum (17) corresponding to the wide space of the second from the left is corrected to the datum (15). FIG. 4(e) indicates a digital signal newly produced on the basis of the corrected data (d) in the step 130 in FIG. 3. The signal processes indicated from (a) to (e) are effected in the bar code reading apparatus 1. On the other hand, the following signal processes are performed in the decoder 3. FIG. 4(f) indicates the width data which are obtained on the basis of the digital signal (e) in the decoder 3. Further, the decoder 3 distinguishes the kinds of the widths on the basis of the data (f) so as to obtain digital data [1] or [0] as indicated by (g). FIG. 4(h) shows characters obtained by decoding the data (g) where the leftmost datum indicates "start" and the rightmost datum indicates "stop". Here, FIG. 4 is an illustration only for description of the operational flow, but not showing the actual bar code system.

Figure 5:
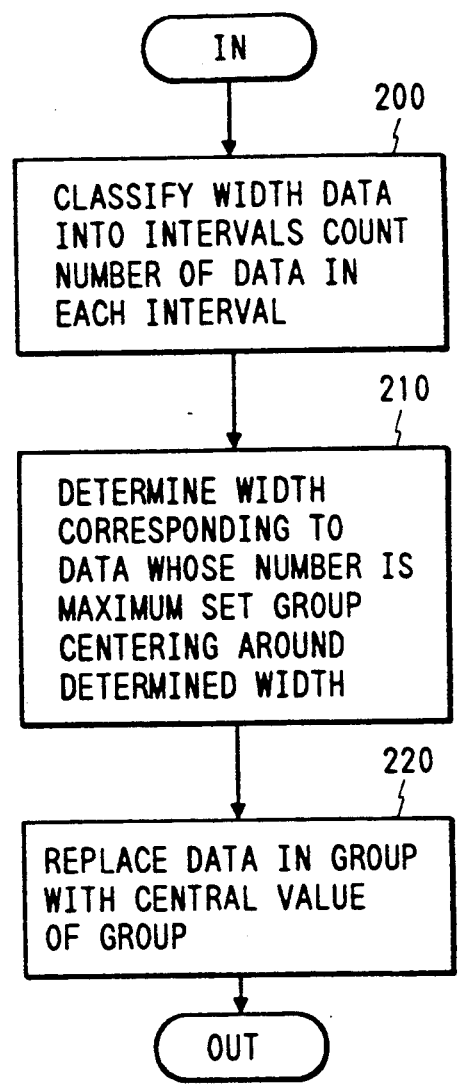
FIG. 5 is a flow chart showing operation of the reading apparatus according to a first embodiment of this invention.
Figure 6A:
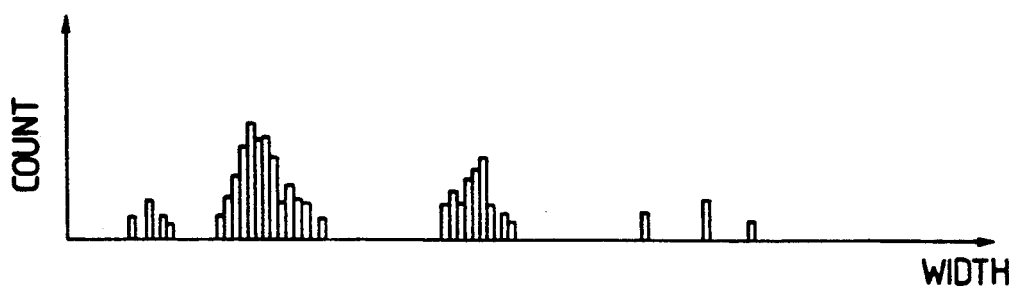
FIGS. 6A to 6C are illustrations for describing the operation of the reading apparatus according to the first embodiment.
Figure 6B:
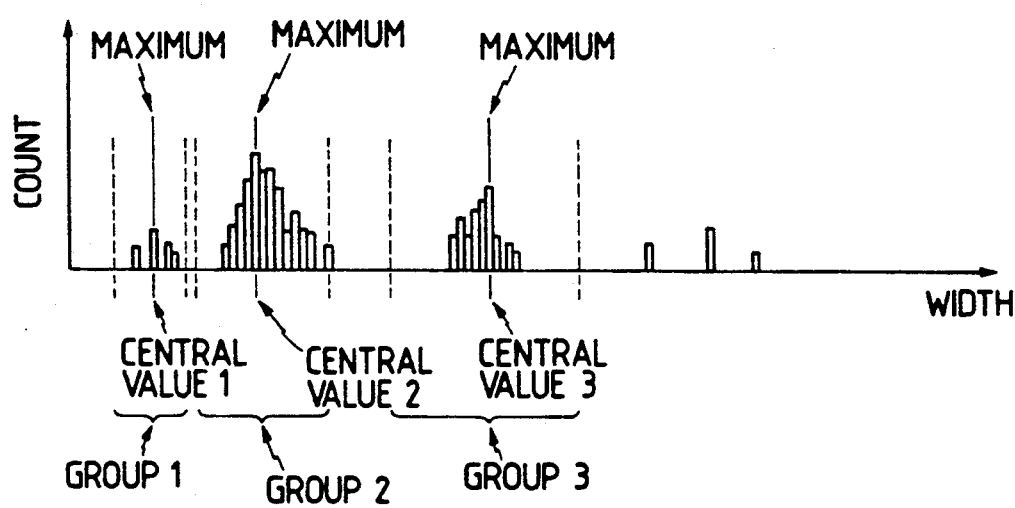
Figure 6C:
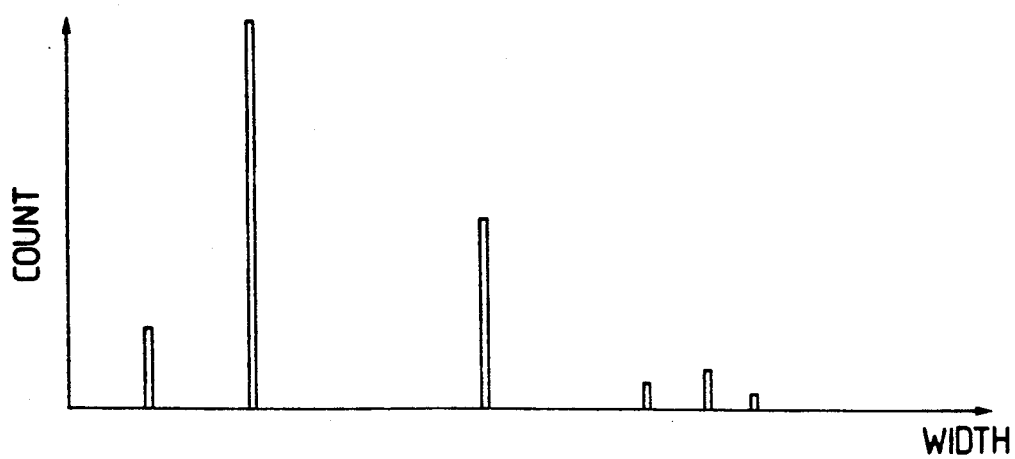

A description will be made below in terms of the data classification process in the step 120 of FIG. 3 with reference to FIGS. 5 and 6A to 6C. The description thereof will be made for the data classification of the spaces in the case of a bar code in which spaces with relatively wider widths are disposed at both the sides. In FIG. 5, a step 200 is first executed to classify the width data, stored in the memory 192 in the step 110 of FIG. 3, into a plurality of small intervals, i.e., successively distribute and accumulate the read data in the order of reading to the corresponding intervals as illustrated in FIG. 6A. The number of the accumulated data (the number of the spaces) in each of the intervals is counted. A step 210 follows to check the intervals each including a large amount of the data so as to set a range of $\pm A\%$ centering around each of the intervals where A is a value varying in accordance with the shape of the histogram. The data belonging to this range is treated as one group, thereby forming a plurality of groups (first to third groups in FIG. 6B) as illustrated in FIG. 6B. Here, for determining the center interval, even if one interval includes a large amount of the data, in the case that the data in the intervals at the vicinity of this interval are absent (zero), this inverval is not treated as the center interval. In a step 220, all the data in each of the respective groups are replaced with the central value in the group as illustrated in FIG. 6C.

With this pretreatment process preceding the decoder 3, it is possible to correct the data so as to reduce the influence on the optical and electrical distortion in the data-reading stage and the scattering of the data due to the bar code printing errors. Thus, since the signal corresponding to the corrected data is supplied to the decoder 3, it is possible to prevent the reading accuracy or capacity of the whole system from depending upon the decoding ability of the decoder 3 so as to accurately and surely decode the bar code information.

Figure 7:
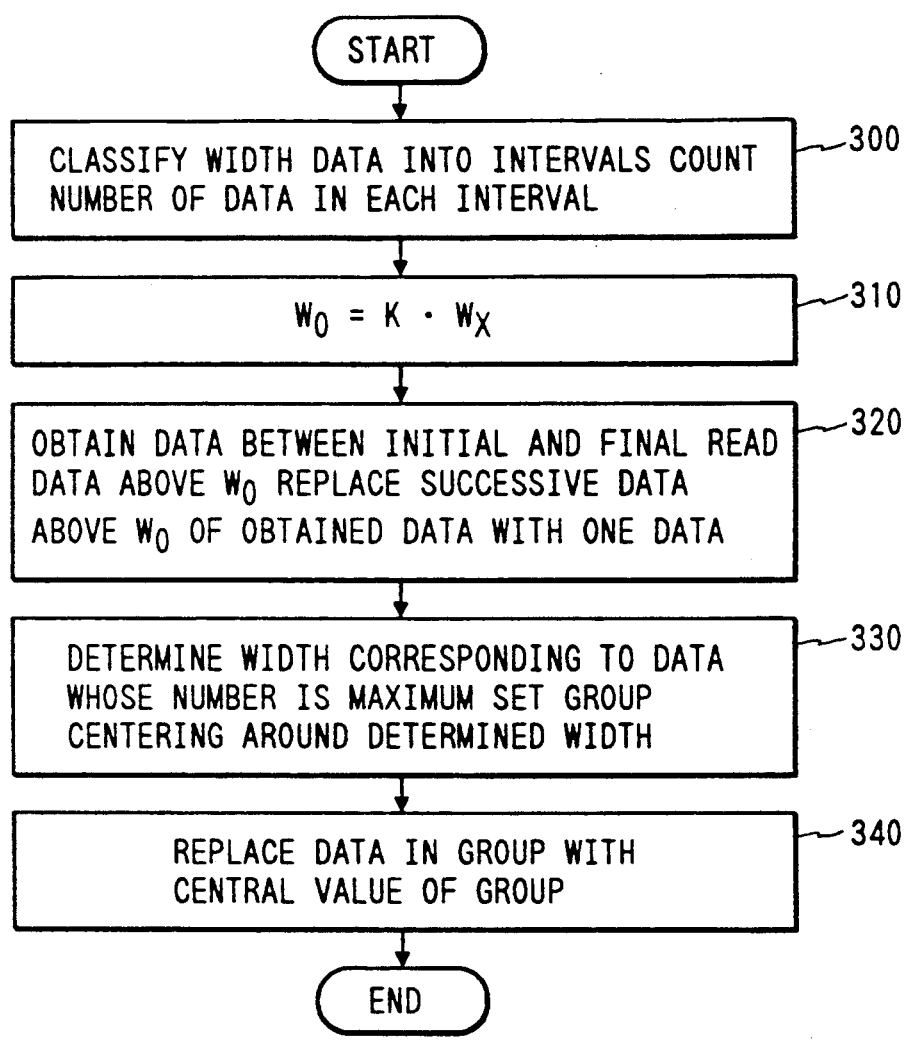
FIG. 7 is a flow chart showing operation of a reading apparatus according to a second embodiment of this invention.
Figure 8A:
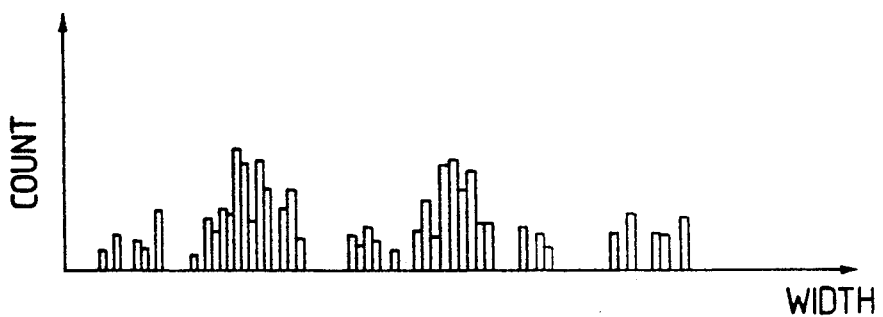
FIGS. 8A to 8C are illustrations for describing the operation of the second embodiment.
Figure 8B:
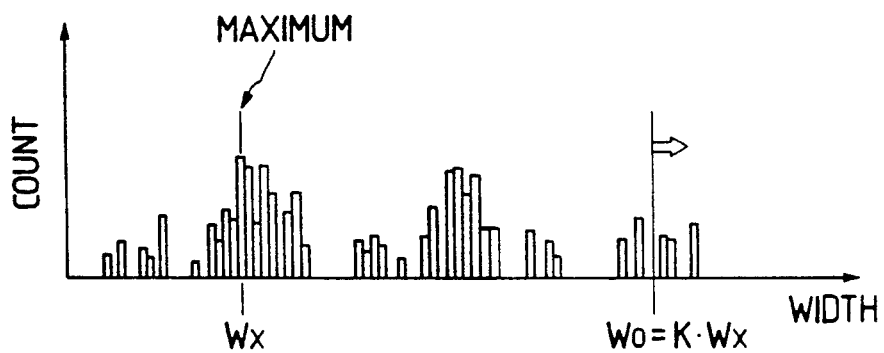

A description will be made hereinbelow in terms of a second embodiment of this invention with reference to FIGS. 7 and 8A to 8C. This second embodiment differs in data processing method from the above-described first embodiment. Since in the second embodiment steps 300, 330 and 340 of the flow chart of FIG. 7 respectively execute the same processes as the steps 200, 210 and 220 in FIG. 5, the description thereof will be omitted for brevity. In FIG. 7, after the execution of the step 300 for counting the amount of the data (FIG. 8A), a step 310 follows to obtain the value Wx of the space width corresponding to the interval which has the largest amount of the data so as to obtain a value Wo made by multiplying the value Wx by a given constant K (FIG. 8B). A subsequent step 320 is executed to process the bar code data (here, space data) in terms of the space widths in the order of reading. This process will be described below with reference to FIGS. 9A to 9C. In FIG. 9A (the total data number : 12), of the data (b, d, f, g, j) above the space width of Wo, the initially read data (b) and the finally read data (j) are searched so that only the data (c, d, e, f, g, h, i) between the initially read data (b) and the finally read data (j) are left as it is and the other data (a, b, j, k, l) are eliminated as illustrated in FIG. 9B. Here, the reason that the data other than the data between the initially and finally read data are removed is that the data b and j correspond to the margins of the bar code and the data a, k and l are due to dust or the like at the outsides of the margins.

Of the remaining data, the data (d, f, g) above Wo are searched. Thereafter, it is checked whether, of the data (d, f, g) above Wo, there are the data (f, g) which are successively presented. If the answer of this checking is affirmative, the successive data (f, g) are replaced with the average value (m in FIG. 9C) thereof. On the other hand, if the answer is negative, no process is effected for the non-successive data. Here, the reason that the data above Wo are left and the successive data above Wo are replaced with a single data is for a mark (separator) to indicate no succession of the data.

Figure 8C:
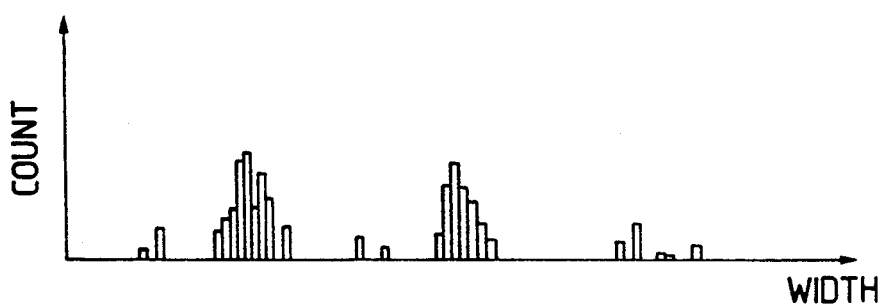
Figure 9A:
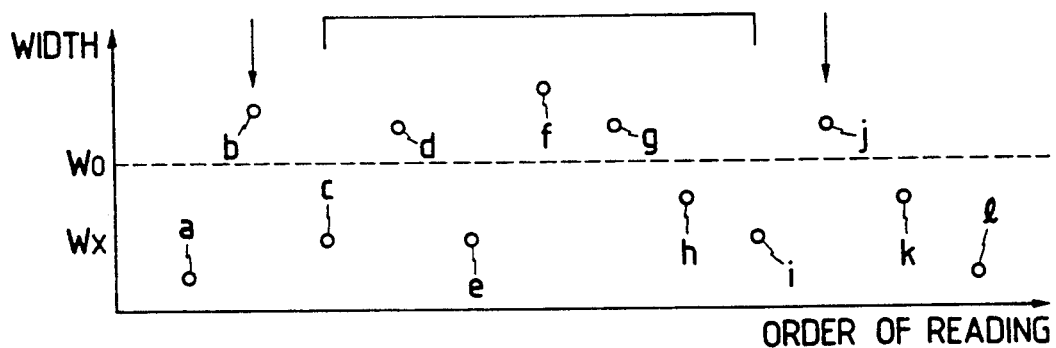
FIGS. 9A to 9C are illustrations for describing the data classification in the operation of the second embodiment.
Figure 9B:
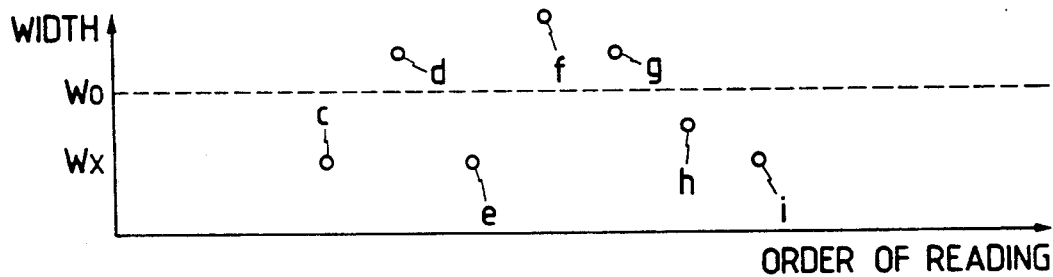
Figure 9C:
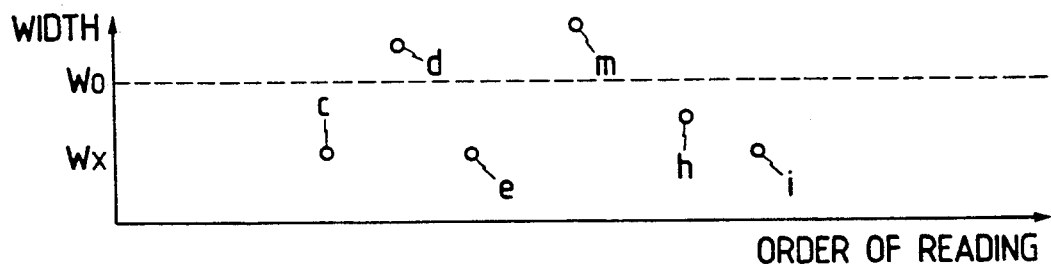

Under this result, the space widths are again classified into a plurality of small intervals and the data is distributed and accumulated in the corresponding intervals in the order of reading as illustrated in FIG. 8C. Thereafter, the steps 330 and 340 are continuously executed.

According to the second embodiment which further includes the statistic processes (steps 310 and 320) as compared with the first embodiment, since in the step 320 the data presented at the outsides of the margins of the bar code 5 is cancelled, it is possible to easily and accurately obtain the value of the space width of the interval having a large amount of the data in the step 330.

On the other hand, in the case of performing the above processes in terms of the bars, rather than spaces, in the second embodiment, the data (b, j in FIG. 9A) corresponding to the margins of the spaces of the bar code 5 are first searched so that the above-described processes are effected on the basis of the initial read data and the finally read data of the data between the margin data. Here, in this case, unlike the processes for the spaces, the initially read data and the finally read data are respectively left. Further, the bar data presented between the successive space data above Wo are eliminated.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above-described embodiments a CCD-type image sensor 18 is used, it is appropriate to use a MOS-type image sensor therefor. Further, it is appropriate to use a laser scanner to scan a bar code with scanning laser light to read the bar code by detecting the reflected light. Still further, an incandescent lamp or a laser can be used instead of the LED as the light source 13 for illuminating the bar code 5. In the case of using in at a well-lit place, the light source 13 can be omitted. In addition, in the case of the optical sensor coming into contact with or approaching the bar code 5, the optical system such as the mirror 15 and the lens 16 can be removed. Moreover, although in the above-described embodiments all the data in the group are replaced with the central value of the group, it is appropriate that all the data are replaced with the average value of the group or a predetermined constant. Further, it is also appropriate that the group having a relatively narrower space width are replaced with a value smaller than the central value of the group and the group having a relatively wider bar width are replaced with a value greater than the central value of the group. Furthermore, it is not required that all the data in the group are replaced with one value (the central value), but the value with which the data are replaced can vary in accordance with the deviation from the central value. Thus, the data can be replaced with one or more data characterizing the group. Further, although in the first and second embodiments the description has been made in terms of a bar code having spaces (white) as the margins, these embodiments can similarly be employed for a bar code having bars (black) as the margins.

What is claimed is:

1. A bar code reading apparatus for optically reading a bar code to output as bar code information a digital signal indicating widths of successively alternately arranged bars and spaces of said bar code with its high-level durations and low-level separations to a decoder for decoding said digital signal indicative of said bar code information, said apparatus comprising:

a hand-operable housing;

producing means for producing an image of said bar code within said housing;

sensor means encased in said housing and equipped with a plurality of picture elements one-dimensionally arranged, for converting said image of said bar code into an electric signal at every picture element and for successively outputting said electric signals corresponding to said bar code;

signal processing means provided in said housing for smoothing said electric signal output from said sensor means at every picture element and for converting said electric signals into a digital signal, said digital signal having alternate high-level portions and low-level portions, said portions having time periods corresponding to said widths of said bars and spaces of said bar code;

width data producing means encased in said housing and responsive to said digital signal from said signal processing means, for producing a plurality of width data indicating said widths of said bars and spaces of said bar code on the basis of said high-level time periods and low-level time periods of said digital signal from said signal processing means;

memory means encased in said housing for successively storing said plurality of width data produced by said width data producing means;

classifying means encased in said housing for classifying said plurality of width data stored in said memory means into a plurality of groups;

correction means encased in said housing for correcting said plurality of width data so as to narrow scattering of said width data in each of said groups classified by said classifying means and for outputting corrected width data;

digital signal reproducing means encased in said housing for reproducing a digital signal having alternate high-level portions and low-level portions, said portions having time periods corresponding to said corrected width data output by said correction means; and signal outputting means encased in said housing for outputting said digital signal reproduced by said reproducing means to decoder located external to said housing.

2. An apparatus as claimed in claim 1, wherein said signal processing means is a signal processing circuit encased in said housing to smooth said electric signals output from said sensor means at every picture element and to convert said smoothed electric signals into a digital signal with high-levels and low-levels which are alternately and successively switched.

3. An apparatus as claimed in claim 1, wherein said width data producing means, said classifying means, said correction means and said digital signal reproducing means are realized by operations of a microcomputer coupled to said memory means.

4. An apparatus as claimed in claim 1, wherein said correction means corrects said plurality of width data in each of said plurality of groups to one or more representative values.

5. An apparatus as claimed in claim 1, wherein said correction means corrects said plurality of width data in each of said plurality of groups to a central value of the corresponding group.

6. An apparatus as claimed in claim 1, wherein said classifying means classifies said plurality of width data into a first group including relatively narrow width data and a second group including relatively wide width data.

7. An apparatus as claimed in claim 6, wherein said correction means detects a first width indicative of a widest width in said first group and a second width indicative of a narrowest width in said second group and corrects said first and second width so as to enlarge a separation therebetween.

8. A bar code reading apparatus for optically reading a bar code to output as bar code information a digital signal indicating widths of successive alternately arranged bars and spaces of said bar code by high-level durations and low-level separations to a decoder for decoding said digital signal indicative of the bar code information, said apparatus comprising:

a hand-operable housing;

conversion means encased in said housing for optically detecting said bar code and outputting a digital signal, said digital signal having alternate high-level portions and low-level portions, said portions having time periods corresponding to said widths of said bars and spaces of said bar code; and preprocessing means encased in said housing for correcting said high-level time periods and low-level time periods of said digital signal so as to narrow scattering of a distribution of said widths of said bars and spaces indicated by said high-level time periods and low-level time periods and for producing a corrected digital signal which is in turn supplied to said decoder located external to said housing.

9. An apparatus as claimed in claim 8, wherein said preprocessing means corrects said high-level time periods and low-level time periods of said digital signal so as to narrow scattering of said distribution of said widths of said bars and spaces in each of a plurality of groups, said groups being formed by classifying data indicative of said bar code.

10. An apparatus as claimed in claim 9, wherein said preprocessing means corrects said high-level time periods and low-level time periods of said digital signal so as to narrow scattering of said distribution at every group of widths of said bars and spaces of said bar code.

11. An apparatus as claimed in claim 9, wherein said preprocessing means corrects said high-level time periods and low-level time periods of said digital signal so as to enlarge a separation between a widest width in a first group including relatively narrow widths and a narrowest width in a second group including relatively wide widths.

12. A bar code reading apparatus for outputting an electric signal indicative of widths of bars and spaces of a bar code to a decoder for decoding bar code information by distinguishing ranges of said widths of said bars and spaces of said bar code, said apparatus comprising:

a hand-operable housing;

conversion means encased in said housing for optically detecting said bar code and converting said optically detected bar code into an electric signal in correspondence with said widths of said bars and spaces thereof; and preprocessing means encased in said housing for correcting said electric signal from said conversion means to distinguish said ranges of said widths of said bars and spaces and for outputting a corrected electric signal to said decoder located external to said housing.

13. An apparatus as claimed in claim 12, wherein said preprocessing means corrects said electric signal so as to enlarge a separation between a widest width in a first group including relatively narrow widths and a narrowest width in a second group including relatively wide widths.

14. An apparatus as claimed in claim 1, wherein said sensor means comprises a CCD-type image sensor.

15. An apparatus as claimed in claim 1, wherein said sensor means comprises a MOS-type image sensor.

16. An apparatus as claimed in claim 1, wherein said producing means comprises an LED.

17. An apparatus as claimed in claim 1, wherein said producing means comprises an incandescent lamp.

18. An apparatus as claimed in claim 1, wherein said producing means comprises a laser.

19. An apparatus as claimed in claim 1, wherein said producing means comprises a mirror and a lens.

* * * * *